United States Patent
Tang et al.

(10) Patent No.: US 11,862,830 B2
(45) Date of Patent: Jan. 2, 2024

(54) MEMBRANE ELECTRODE ASSEMBLY WITH HIGH-EFFICIENCY WATER AND HEAT MANAGEMENT FOR DIRECT ETHANOL FUEL CELL, AND FABRICATION METHOD THEREFOR

(71) Applicant: JIANGSU UNIVERSITY, Jiangsu (CN)

(72) Inventors: Dong Tang, Jiangsu (CN); Guoliang Xu, Jiangsu (CN); Yubin Han, Jiangsu (CN); Shengyao Shi, Jiangsu (CN); Yang Xiao, Jiangsu (CN)

(73) Assignee: Jiangsu University, Jiangsu (CN)

( * ) Notice: Subject to any disclaimer, the term of this patent is extended or adjusted under 35 U.S.C. 154(b) by 21 days.

(21) Appl. No.: 17/795,537

(22) PCT Filed: Aug. 25, 2021

(86) PCT No.: PCT/CN2021/114561
§ 371 (c)(1),
(2) Date: Jul. 27, 2022

(87) PCT Pub. No.: WO2023/004909
PCT Pub. Date: Feb. 2, 2023

(65) Prior Publication Data
US 2023/0197992 A1    Jun. 22, 2023

(30) Foreign Application Priority Data
Jul. 30, 2021  (CN) .......................... 202110871428.3

(51) Int. Cl.
*H01M 8/1004*   (2016.01)
*H01M 4/88*   (2006.01)
*H01M 8/1011*   (2016.01)

(52) U.S. Cl.
CPC ......... *H01M 8/1004* (2013.01); *H01M 4/881* (2013.01); *H01M 4/8807* (2013.01);
(Continued)

(58) Field of Classification Search
CPC . H01M 8/1044; H01M 4/8807; H01M 8/1011
See application file for complete search history.

(56) References Cited

U.S. PATENT DOCUMENTS

2021/0050612 A1*  2/2021  Park ..................... H01M 8/1011

FOREIGN PATENT DOCUMENTS

| CN | 102870262 | 1/2013 |
|---|---|---|
| CN | 103199268 | 7/2013 |

(Continued)

OTHER PUBLICATIONS

"International Search Report (Form PCT/ISA/210) of PCT/CN2021/114561," datedApr. 26, 2022, pp. 1-5.
(Continued)

*Primary Examiner* — Brian R Ohara
(74) *Attorney, Agent, or Firm* — JCIPRNET

(57) ABSTRACT

The present disclosure provides a membrane electrode assembly (MEA) with high-efficiency water and heat management for a direct ethanol fuel cell (DEFC), and a fabrication method therefor, and belongs to the technical field of fuel cells. In the MEA for a DEFC in the present disclosure, a cathode catalyst layer is designed to be convex and ordered and an anode catalyst layer is designed to be concave and ordered, which is conducive to the timely discharge of the generated heat. The MEA for a DEFC can be fabricated by gradually fabricating each layer of the MEA on an inner surface and an outer surface of a proton-exchange membrane (PEM) or by step-by-step dip coating on an anode support tube. The present disclosure can effectively improve the working capacity of the cell.

11 Claims, 3 Drawing Sheets

(52) U.S. Cl.
CPC ....... *H01M 4/8828* (2013.01); *H01M 4/8882* (2013.01); *H01M 8/1011* (2013.01)

(56) References Cited

FOREIGN PATENT DOCUMENTS

| | | |
|---|---|---|
| CN | 105047963 | 11/2015 |
| CN | 110444791 | 11/2019 |
| CN | 110752386 | 2/2020 |
| CN | 111864242 | 10/2020 |
| CN | 112117465 | 12/2020 |
| TW | 200835035 | 8/2008 |
| WO | 2021137518 | 7/2021 |

OTHER PUBLICATIONS

"Written Opinion of the International Searching Authority (Form PCT/ISA/237) of PCT/CN2021/114561," dated Apr. 26, 2022, pp. 1-3.

"Written Opinion of the International Searching Authority (Form PCT/ISA/237) of PCT/CN2021/114561," dated Apr. 26, 2022, with English translation thereof, pp. 1-7.

* cited by examiner

MEMBRANE ELECTRODE ASSEMBLY WITH HIGH-EFFICIENCY WATER AND HEAT MANAGEMENT FOR DIRECT ETHANOL FUEL CELL, AND FABRICATION METHOD THEREFOR

CROSS-REFERENCE TO RELATED APPLICATION

This application is a 371 of international application of PCT application serial no. PCT/CN2021/114561, filed on Aug. 25, 2021, which claims the priority benefit of China application no. 202110871428.3, filed on Jul. 30, 2021. The entirety of each of the above mentioned patent applications is hereby incorporated by reference herein and made a part of this specification.

TECHNICAL FIELD

The present disclosure belongs to the technical field of fuel cells, and in particular relates to a membrane electrode assembly (MEA) with high-efficiency water and heat management for a direct ethanol fuel cell (DEFC), and a fabrication method therefor.

DESCRIPTION OF RELATED ART

In recent years, with the increasing consumption of traditional energy sources such as petroleum, the attention of research scholars has been shifted to new renewable energy sources. Fuel cells are power devices that can directly convert chemical energy stored in a fuel into electrical energy without the Carnot cycle and have a high energy density, which play an important role in the future energy strategy. In the 21st century, "peak carbon dioxide emissions and carbon neutrality" has become a theme of energy conservation and emission reduction; and fuel cells have attracted much attention because products of fuel cells are mostly water vapor or liquid water, which basically achieves no pollution.

DEFCs are electrochemical energy sources each with low-concentration ethanol as an anode feed and air as a cathode feed. A DEFC mainly includes cathode and anode plates, a diffusion layer, a catalyst layer, and a proton-exchange membrane (PEM), where ethanol at the anode is oxidized to generate electrons, protons, and a small amount of a carbon dioxide gas, the protons reach the cathode through the PEM, and oxygen at the cathode diffuses to the catalyst layer and is reduced into water. Because ethanol is used as a direct fuel, DEFCs have a lower current density than hydrogen fuel cells, and are mostly used in small portable energy sources such as mobile phones, computers, and radios. In addition, it difficult to configure an active gas supply system for DEFCs due to their small sizes, and thus DEFCs are often designed as passive structures. Compared with the hydrogen fuel cell, the ethanol fuel has the advantages of natural existence, non-toxicity, and easy preparation, is a renewable energy source, and has a broad application space in the future. DEFCs often work at a low temperature (30° C. to 60° C.) and thus often produce a large amount of liquid water during operation, and the accumulation of liquid water at the cathode will cause the blockage (water flooding) of a diffusion layer and a catalyst layer to make the diffusion layer and catalyst layer ineffective and block the transmission of oxygen, which seriously restricts the working life and performance of DEFCs.

An MEA is a core component of a DEFC, and an internal water and heat distribution thereof determines the working efficiency of the DEFC, which is a research hotspot in recent years. Currently, common optimization methods are mainly to change fabrication materials or proportions of the materials during a fabrication process of a cathode, such as adding a dispersing agent to increase a porosity of a porous layer and changing a proportion of a catalyst. Although these methods can improve the efficiency and operating temperature of a cell to some extent, a large amount of water will be generated to make a catalyst layer cracked and flooded, and it is difficult for a too-flat catalyst layer to drain excess water through its own pores, such that an internal resistance of the cell increases, which in turn affects the durability of a PEM. An ethanol solution at an anode cannot quickly diffuse like a gas to an inner side of an anode through pores, and thus a reaction is slow. Such problems have not been well solved.

SUMMARY

In order to solve the problems in the prior art, the present disclosure provides an MEA with high-efficiency water and heat management for a DEFC, and a fabrication method therefor, which can effectively improve the water and heat management at a cathode side and the hydrophilic and efficient mass transfer of ethanol at an anode side.

The present disclosure achieves the above technical objective through the following technical means.

An MEA with high-efficiency water and heat management for a DEFC is provided, including an anode, a cathode, and a PEM, where the anode includes an anode diffusion layer and an anode catalyst layer, and the cathode includes a cathode diffusion layer and a cathode catalyst layer;

the cathode catalyst layer is of a convex and ordered design with a convex curvature radius R1 of 0.2 mm to 0.3 mm and a convex angle $\theta$ of 40° to 60°; and the anode catalyst layer is of a concave and ordered design with a concave curvature radius R2 of 0.2 mm to 0.3 mm and a concave angle $\alpha$ of 30° to 45°.

In the above technical solution, the anode catalyst layer and the cathode catalyst layer each have a porosity of 0.4 to 0.6, and the anode diffusion layer and the cathode diffusion layer each have a porosity of 0.4 to 0.86.

A method for fabricating the MEA with high-efficiency water and heat management for the DEFC is provided, including gradually fabricating each layer of the MEA on an inner surface and an outer surface of the PEM, and including the following steps:

step 1) coating a catalyst layer slurry on the inner surface of the PEM to form the anode catalyst layer, attaching a convex surface A1 of a nanoimprint mold A to the anode catalyst layer, heat-drying, and separating the nanoimprint mold A to obtain the anode catalyst layer of the concave and ordered design;

step 2) uniformly coating a diffusion layer solution on an inner surface of the anode catalyst layer to form the anode diffusion layer with a smooth outer surface, followed by heat-drying, where an inner surface of the anode diffusion layer is in contact with the anode catalyst layer of the concave and ordered design, and is convex;

step 3) coating the catalyst layer slurry on the outer surface of the PEM to form the cathode catalyst layer, attaching a concave surface B2 of a nanoimprint mold B to the cathode catalyst layer, heat-drying, and separating the nanoimprint mold B to obtain the cathode catalyst layer of the convex and ordered design; and step 4) coating the diffusion layer solution on an outer surface of the cathode catalyst layer to form the cathode diffusion layer with a smooth outer surface, followed by heat-drying, where an inner surface of the cathode diffusion layer is in contact with the cathode catalyst layer of the convex and ordered design, and is concave.

Further, a weight gain for forming the anode catalyst layer in the step 1) reaches 8 mg/cm$^2$; and a weight gain for forming the cathode catalyst layer in the step 3) reaches 8 mg/cm$^2$.

Further, a weight gain for forming the anode diffusion layer in the step 2) reaches 4 mg/cm$^2$; and a weight gain for forming the cathode diffusion layer in the step 4) reaches 4 mg/cm$^2$.

A method for fabricating the MEA with high-efficiency water and heat management for the DEFC is provided, including fabricating the MEA by step-by-step dip coating on an anode support tube, and including the following steps:

step 1) uniformly coating a diffusion layer solution on an outer side of the anode support tube to form the anode diffusion layer, attaching a concave surface A2 of a nanoimprint mold A to the anode diffusion layer, heat-drying, and separating the nanoimprint mold A to obtain the anode diffusion layer of a convex and ordered design;

step 2) coating a catalyst layer slurry on a surface of the anode diffusion layer to form the anode catalyst layer with a smooth outer surface, followed by heat-drying, where an inner surface of the anode catalyst layer is in contact with the surface of the anode diffusion layer of the convex and ordered design, and is concave;

step 3) hot-pressing an activated PEM tightly on the outer surface of the anode catalyst layer;

step 4) coating the catalyst layer slurry on a surface of the PEM to form the cathode catalyst layer, attaching a concave surface B2 of a nanoimprint mold B to the cathode catalyst layer, heat-drying, and separating the nanoimprint mold B to obtain the cathode catalyst layer of the convex and ordered design; and step 5) coating the diffusion layer solution on an outer surface of the cathode catalyst layer to form the cathode diffusion layer with a smooth outer surface, followed by heat-drying, where an inner surface of the cathode diffusion layer is in contact with the cathode catalyst layer of the convex and ordered design, and is concave.

Further, an anode obtained after the step 2) is dried at a constant temperature.

Further, a weight gain for forming the anode catalyst layer in the step 2) reaches 8 mg/cm$^2$; and a weight gain for forming the cathode catalyst layer in the step 4) reaches 8 mg/cm$^2$.

Further, a weight gain for forming the anode diffusion layer in the step 1) reaches 4 mg/cm$^2$; and a weight gain for forming the cathode diffusion layer in the step 5) reaches 4 mg/cm$^2$.

Further, a preparation method of the diffusion layer solution includes: dissolving 20 g of an XR-72 carbon powder in a solution with a polytetrafluoroethylene (PTFE) content of 15 wt. %, adding 5 mL of an analytically-pure solution, followed by ultrasonic dispersing and stirring; and a preparation method of the catalyst layer slurry includes: mixing 30 mg of a metal catalyst Pt/C with 0.5 mL of pure water, and adding 0.5 mL of a polymer electrolyte emulsion, mL of a Nafion emulsion with a mass fraction of 5%, 0.5 mL of a binder, and 5 mL of an analytically-pure solution.

Beneficial effects of the present disclosure: In the MEA for a DEFC of the present disclosure, the cathode catalyst layer is designed to be convex and ordered and the anode catalyst layer is designed to be concave and ordered, which increases specific surface areas (SSAs) of the catalyst layers to increase a reaction rate and improve a current density, and is also conducive to the timely discharge of the generated heat. The MEA for a DEFC of the present disclosure can be fabricated by gradually fabricating each layer of the MEA on an inner surface and an outer surface of a PEM or by step-by-step dip coating on an anode support tube. When the MEA for a DEFC is fabricated by gradually fabricating each layer of the MEA on an inner surface and an outer surface of a PEM, it includes the following steps: a catalyst layer slurry is coated on the inner surface of the PEM, a nanoimprint mold is used to form a concave and ordered anode catalyst layer, and an anode diffusion layer is formed on an inner surface of the anode catalyst layer, where an inner surface of the anode diffusion layer is convex; and the catalyst layer slurry is coated on the outer surface of the PEM, a nanoimprint mold is used to form a convex and ordered cathode catalyst layer, and a diffusion layer solution is coated on an outer surface of the cathode catalyst layer to form the cathode diffusion layer, where an inner surface of the cathode diffusion layer is concave. When the MEA for a DEFC is fabricated by step-by-step dip coating on an anode support tube, it includes the following steps: a convex and ordered anode diffusion layer and an anode catalyst layer with a concave inner surface are sequentially fabricated at an outer side of an anode support tube, a PEM is hot-pressed tightly on the outer surface of the anode catalyst layer, and a convex and ordered cathode catalyst layer and a cathode diffusion layer with a concave inner surface are sequentially fabricated at an outer side of the PEM. When the MEA fabricated by the method of the present disclosure is used in a DEFC, the working capacity of the cell can be effectively improved.

In the figures, 1 represents an arc heat sink, 2 represents an ethanol cavity, 3 represents a heat-dissipation through hole, 4 represents an anode catalyst layer, 5 represents an anode diffusion layer, 6 represents a cathode diffusion layer, 7 represents a cathode catalyst layer, 8 represents a PEM, 9 represents an anode support tube, and 10 represents a cathode support tube.

DESCRIPTION OF THE EMBODIMENTS

The present disclosure will be further described below in conjunction with the accompanying drawings and specific examples, but the protection scope of the present disclosure is not limited thereto.

Figure 1:
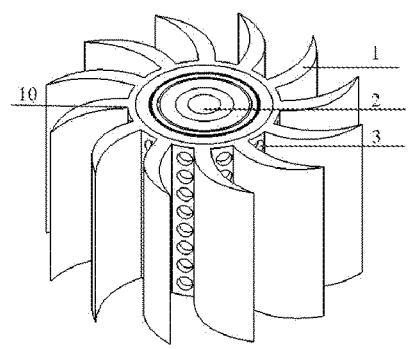
FIG. 1 is a schematic structural diagram of a tubular single DEFC of the present disclosure.
Figure 2:
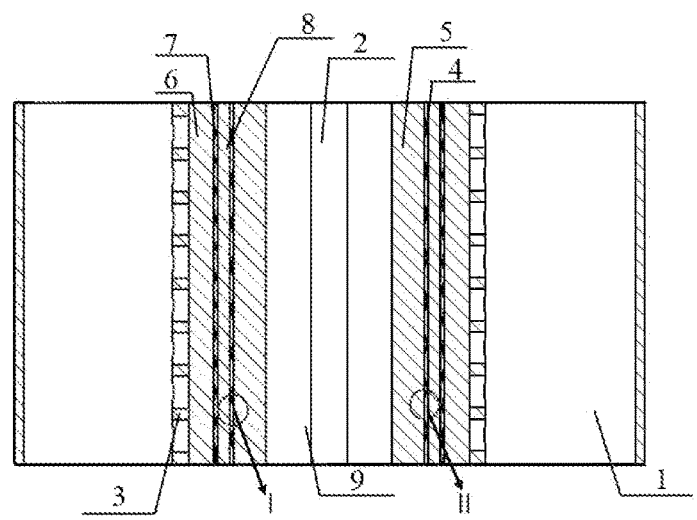
FIG. 2 is a sectional view of a tubular single DEFC of the present disclosure.

As shown in FIG. 1 and FIG. 2, the single tubular DEFC includes a housing, a cathode support tube 10, a cathode, a PEM 8, an anode, an anode support tube 9, and an ethanol cavity 2 that are sequentially arranged from outside to inside. Variable-cross-section arc heat sinks 1 are uniformly distributed on a side wall of the housing, such that an intake gas is uniformly distributed and water generated at a cathode side can be drained. Heat-dissipation through holes 3 are uniformly distributed on a side wall of the housing to realize the passive air intake of the cell, which is conducive to the discharge of water; and the heat-dissipation through holes 3 may have an opening rate of 50% to 60%. The PEM 8 may be one or more selected from the group consisting of commercially-available Nafion115, Nafion211, Nafion117, and Nafion112, and may be activated with a mixed acid.

The anode includes an anode diffusion layer 5 and an anode catalyst layer 4, and the cathode includes a cathode diffusion layer 6 and a cathode catalyst layer 7. The catalyst layer may have a porosity of 0.4 to 0.6, and the diffusion layer may have a porosity of 0.4 to 0.86. In this example, the catalyst layer may have a porosity of preferably 0.5 to 0.6, and the diffusion layer may have a porosity of preferably 0.6 to 0.8; and a thickness of the diffusion layer may be greater than a thickness of the catalyst layer. The anode, cathode, and PEM 8 together constitute a MEA for a DEFC.

Figure 3:
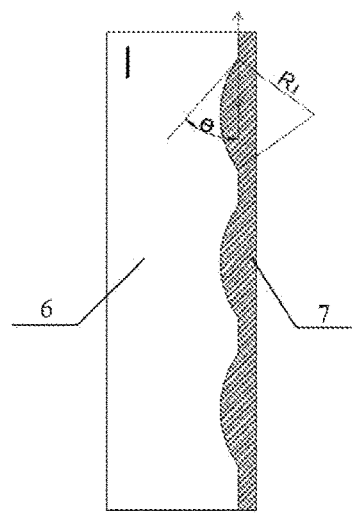
FIG. 3 is a schematic diagram of an ordered cathode catalyst layer of the present disclosure.

As shown in FIG. 3, the cathode catalyst layer 7 is of a convex and ordered design with a convex curvature radius R1 of 0.2 mm to 0.3 mm and a convex angle θ of 40° to 60°. The convex and ordered design can make a surface of the cathode catalyst layer 7 have a large liquid water contact angle, and the large angle θ is conducive to the separation of liquid water. During the reaction process, since the convex and ordered design allows a large pressure difference inside the cathode catalyst layer 7, the generated water can be timely and effectively drained under the action of the pressure difference. In addition, compared with the neat catalyst layer designed in the prior art, an SSA of the catalyst layer is increased to improve the reaction rate and current density, which is also conducive to the timely discharge of the generated heat.

Figure 4:
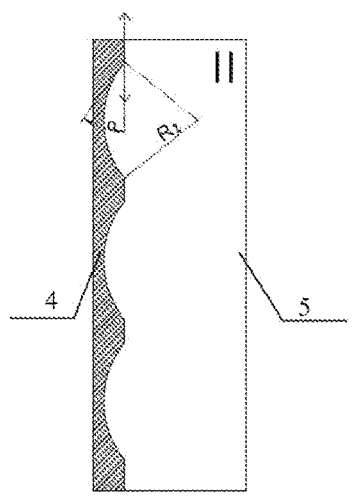
FIG. 4 is a schematic diagram of an ordered anode catalyst layer of the present disclosure.

As shown in FIG. 4, the oxidation reaction of ethanol is mainly considered at the anode; and in order to make ethanol pass through the diffusion layer and reach the catalyst layer for reaction as much as possible and improve the hydrophilic effect at the anode side, the anode catalyst layer 4 is of a concave and ordered design with a concave curvature radius R2 of 0.2 mm to 0.3 mm and a concave angle α of 30° to 45°. The concave and ordered design makes a surface of the anode catalyst layer 4 have a small liquid water contact angle, which increases the water adsorption capacity. The convex surface of the anode diffusion layer 5 makes ethanol at the anode largely infiltrate a surface of the anode catalyst layer 4, which improves the mass transfer rate and current density. In addition, compared with the neat catalyst layer designed in the prior art, an SSA of the anode catalyst layer 4 is increased to improve the reaction rate and current density, which is also conducive to the timely discharge of the generated heat.

Example 1

Figure 5:
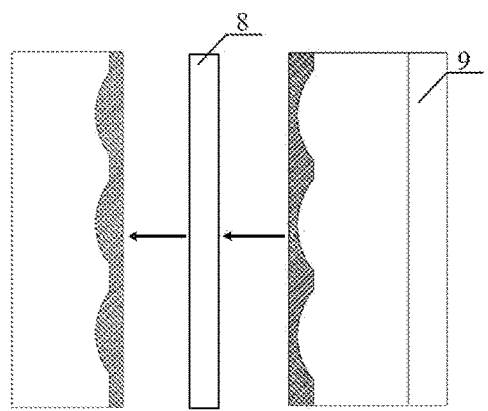
FIG. 5 is a schematic diagram of the fabrication method in Example 1 of the present disclosure.

As shown in FIG. 5, an MEA for a DEFC was fabricated by step-by-step dip coating on an anode support tube 9, including the following steps.

Step (1): 25.5 g of asphalt microsphere particles, 4.5 g of an XR-72 toner, 20 mL of Tween 80, 5 mL of triethylhexylphosphate, and 0.4 g of ammonium persulfate (APS) were weighed and mixed with 20 g of deionized water, and the resulting mixture was stirred and ultrasonically dispersed, then subjected to injection molding, and sintered in a crucible furnace to obtain a cathode support tube 10 and an anode support tube 9.

Step (2): 20 g of an XR-72 carbon powder was weighed and dissolved in a solution with a PTFE content of 15 wt. %, then 5 mL of an analytically-pure solution (a low-concentration methanol solution or low-concentration ethanol solution) was added, and the resulting mixture was ultrasonically dispersed by a magnetic disperser and stirred to obtain a diffusion layer solution.

Step (3): The diffusion layer solution was uniformly coated on an outer side of the anode support tube 9, and when a weight gain of the anode support tube 9 reached 4 mg/cm$^2$, the coating was stopped to form the anode diffusion layer 5 at the outer side of the anode support tube 9; a concave surface A2 of the nanoimprint mold A was attached to the anode diffusion layer 5, and the resulting product was put as a whole in a drying oven, heat-dried for 1 h to be thermally expanded, and taken out; and the nanoimprint mold A was separated to obtain a convex and ordered anode diffusion layer 5, and the anode diffusion layer was allowed to stand for half an hour in a dry environment.

Step (4): 30 mg of a metal catalyst Pt/C was weighed and mixed with 0.5 mL of pure water, and then 0.5 mL of a polymer electrolyte emulsion, 10 mL of a Nafion emulsion with a mass fraction of 5%, 0.5 mL of a binder, and 5 mL of an analytically-pure solution were added to prepare a catalyst layer slurry; the catalyst layer slurry was coated on a surface of the anode diffusion layer 5, and when a weight gain reached 8 mg/cm$^2$, the coating was stopped to obtain an anode catalyst layer 4 with a smooth outer surface; and the resulting product was put as a whole in a drying oven, heat-dried for 1 h, taken out, and allowed to stand for half an hour in a dry environment, where an inner surface of the anode catalyst layer 4 was in contact with a surface of the convex anode diffusion layer 5 and was concave.

Step (5): The obtained anode was heated in a constant-temperature water bath for 1 h and then dried at 100° C., and then an activated PEM 8 was hot-pressed tightly on the surface of the anode catalyst layer 4.

Step (6): The catalyst layer slurry (the same as in the step (4)) was repeatedly coated on a surface of the PEM 8, and when a weight gain reached 8 mg/cm$^2$, the coating was stopped to form a cathode catalyst layer 7 at an outer side of the PEM 8; a concave surface B2 of the nanoimprint mold B was attached to the cathode catalyst layer 7, and the resulting product was put as a whole in a drying box, heat-dried for 1 h to be thermally expanded, and then taken out; and the nanoimprint mold B was separated to obtain a convex and ordered cathode catalyst layer 7, and the cathode catalyst layer was allowed to stand for half an hour in a dry environment.

Step (7): The diffusion layer solution (the same as in the step (2)) was repeatedly coated on a surface of the cathode catalyst layer 7, and when a weight gain reached 4 mg/cm$^2$, the coating was stopped to form the cathode diffusion layer 6 with a smooth outer surface on an outer side of the cathode catalyst layer 7; and the resulting product was put as a whole in a drying oven, heat-dried for 1 h, taken out, and allowed to stand for half an hour in a dry environment, where an inner surface of the cathode diffusion layer 6 was in contact with a surface of the convex cathode catalyst layer 7 and was concave.

Example 2

Figure 6:
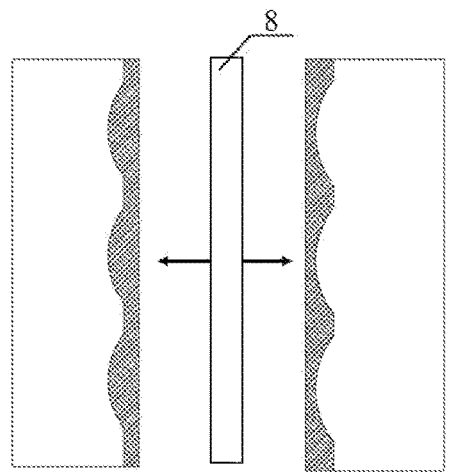
FIG. 6 is a schematic diagram of the fabrication method in Example 2 of the present disclosure.

As shown in FIG. 6, an MEA for a DEFC was fabricated by gradually fabricating each layer of the MEA on an inner surface and an outer surface of a PEM 8, including the following steps.

Step (1): An activated PEM 8 was prepared and placed in a dry environment.

Step (2): 30 mg of a metal catalyst Pt/C was weighed and mixed with 0.5 mL of pure water, and then 0.5 mL of a polymer electrolyte emulsion, 10 mL of a Nafion emulsion with a mass fraction of 5%, 0.5 mL of a binder, and 5 mL of an analytically-pure solution were added to prepare a catalyst layer slurry; the catalyst layer slurry was coated on the inner surface of the PEM 8, and when a content of the catalyst layer slurry reached 8 mg/cm$^2$, the coating was stopped to obtain an anode catalyst layer 4; and a convex surface A1 of the nanoimprint mold A was attached to the anode catalyst layer 4, the resulting product was put as a whole in a drying oven, heat-dried for 1 h to be thermally expanded, and then taken out, and the nanoimprint mold A was separated to obtain a concave and ordered anode catalyst layer 4.

Step (3): 20 g of an XR-72 carbon powder was weighed and dissolved in a solution with a PTFE content of 15 wt. %, then 5 mL of an analytically-pure solution was added, and the resulting mixture was ultrasonically dispersed with a magnetic disperser and stirred to obtain a diffusion layer solution; the diffusion layer solution was uniformly coated on an inner surface of the formed anode catalyst layer 4, and when a weight gain reached 4 mg/cm$^2$, the coating was stopped to form the anode diffusion layer 5 with a smooth outer surface; and the resulting product was put as a whole in a drying oven, heat-dried for 1 h, and then taken out, where an inner surface of the anode diffusion layer 5 was in contact with the concave and ordered anode catalyst layer 4 and was convex.

Step (4): The catalyst layer slurry (the same as in the step (2)) was coated on the outer surface of the PEM 8, and when a weight gain reached 8 mg/cm$^2$, the coating was stopped to form a cathode catalyst layer 7 at an outer side of the PEM 8; a concave surface B2 of the nanoimprint mold B was attached to the cathode catalyst layer 7, and the resulting product was put as a whole in a drying box, heat-dried for 1 h to be thermally expanded, and then taken out; and the nanoimprint mold B was separated to obtain a convex and ordered cathode catalyst layer 7, and the cathode catalyst layer was allowed to stand for half an hour in a dry environment.

Step (5): The diffusion layer solution (the same as in the step (3)) was repeatedly coated on an outer surface of the cathode catalyst layer 7, and when a weight gain reached 4 mg/cm$^2$, the coating was stopped to form the cathode diffusion layer 6 with a smooth outer surface on an outer side of the cathode catalyst layer 7; and the resulting product was put as a whole in a drying oven, heat-dried for 1 h, taken out, and allowed to stand for half an hour in a dry environment, where an inner surface of the cathode diffusion layer 6 was in contact with the convex cathode catalyst layer 7 and was concave.

Figure 7:
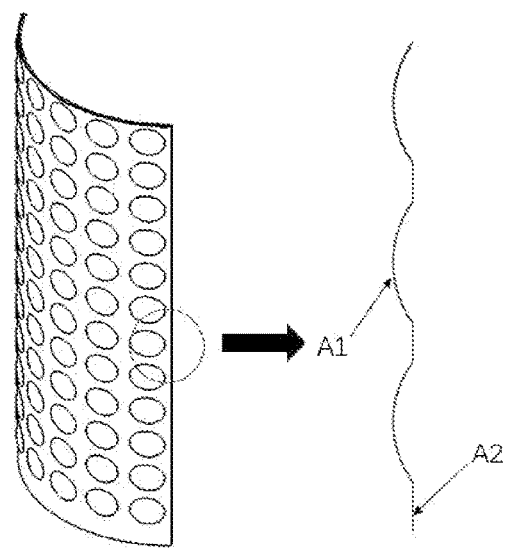
FIG. 7 is a schematic structural diagram of the nanoimprint mold A in Example 1 of the present disclosure.

FIG. 7 is a schematic structural diagram of the nanoimprint mold A in Example 1, where A1 represents a convex surface of the nanoimprint mold A and A2 represents a concave surface of the nanoimprint mold A. The nanoimprint mold B is different from the nanoimprint mold A only in that the curvature radius R and the concave and convex angles are different; and a schematic diagram of the nanoimprint mold B is not listed here.

Figure 8:
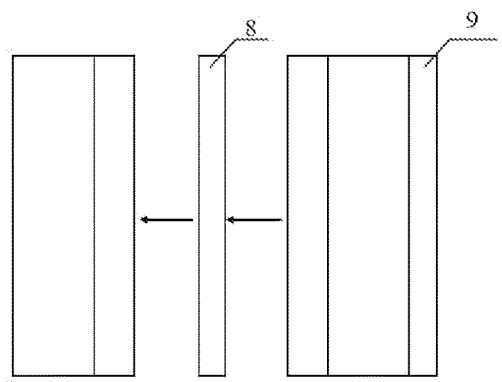
FIG. 8 is a schematic diagram of a conventional fabrication method.

The MEA, anode diffusion layer, anode catalyst layer, cathode diffusion layer, and cathode catalyst layer conventionally fabricated are all designed to be neat, as shown in FIG. 8.

Figure 9:
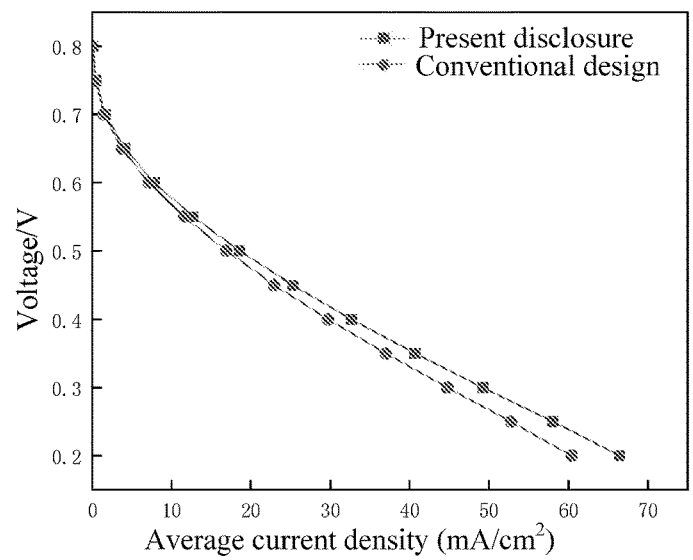
FIG. 9 shows polarization curves of single cells fabricated by the method of the present disclosure and the conventional method.

From the comparison between polarization characteristic curves of the MEAs fabricated by the conventional method and the method of the present disclosure shown in FIG. 9, it can be clearly seen that the performance of a cell with an ordered catalyst layer design is higher than the performance of a cell fabricated by the conventional method, which effectively improves the working capacity of the cell.

The above examples are preferred implementations of the present disclosure, but the present disclosure is not limited to the above implementations. Any obvious improvement, substitution, or modification made by those skilled in the art without departing from the essence of the present disclosure should fall within the protection scope of the present disclosure.

What is claimed is:

1. A membrane electrode assembly with high-efficiency water and heat management for a direct ethanol fuel cell (DEFC), comprising an anode, a cathode, and a proton-exchange membrane,
    wherein the anode is composed of an anode diffusion layer and an anode catalyst layer, and the cathode is composed of a cathode diffusion layer and a cathode catalyst layer,
    the cathode catalyst layer is of a convex and ordered design with a convex curvature radius R1 of 0.2 mm to 0.3 mm and a convex angle θ of 40° to 60°, and
    the anode catalyst layer is of a concave and ordered design with a concave curvature radius R2 of 0.2 mm to 0.3 mm and a concave angle α of 30° to 45°.

2. The membrane electrode assembly with high-efficiency water and heat management for the DEFC according to claim 1, wherein both of the anode catalyst layer and the cathode catalyst layer have a porosity of 0.4 to 0.6, and both of the anode diffusion layer and the cathode diffusion layer have a porosity of 0.4 to 0.86.

3. A method for fabricating the membrane electrode assembly with high-efficiency water and heat management for the DEFC according to claim 1, comprising gradually fabricating the membrane electrode assembly on an inner surface and an outer surface of the proton-exchange membrane, and comprising the following steps:
    a step 1), coating a catalyst layer slurry on the inner surface of the proton-exchange membrane to form the anode catalyst layer, attaching a convex surface A1 of a nanoimprint mold A on the anode catalyst layer, heat-drying, and separating the nanoimprint mold A to obtain the anode catalyst layer of the concave and ordered design;
    a step 2), uniformly coating a diffusion layer solution on an inner surface of the anode catalyst layer to form the anode diffusion layer with a smooth outer surface, and heat-drying, wherein an inner surface of the anode diffusion layer is in contact with the anode catalyst layer of the concave and ordered design, and is convex;
    a step 3), coating the catalyst layer slurry on the outer surface of the proton-exchange membrane to form the cathode catalyst layer, attaching a concave surface B2 of a nanoimprint mold B on the cathode catalyst layer, heat-drying, and separating the nanoimprint mold B to obtain the cathode catalyst layer of the convex and ordered design; and a step 4), coating the diffusion layer solution on an outer surface of the cathode catalyst layer to form the cathode diffusion layer with a smooth outer surface, and heat-drying, wherein an inner surface of the cathode diffusion layer is in contact with the cathode catalyst layer of the convex and ordered design, and is concave.

4. The method according to claim 3, wherein a weight gain for forming the anode catalyst layer in the step 1) reaches 8 mg/cm$^2$; and a weight gain for forming the cathode catalyst layer in the step 3) reaches 8 mg/cm$^2$.

5. The method according to claim 3, wherein a weight gain for forming the anode diffusion layer in the step 2) reaches 4 mg/cm$^2$; and a weight gain for forming the cathode diffusion layer in the step 4) reaches 4 mg/cm$^2$.

6. A method for fabricating the membrane electrode assembly with high-efficiency water and heat management for the DEFC according to claim 1, comprising fabricating the membrane electrode assembly through step-by-step dip coating on an anode support tube, and comprising the following steps:

a step 1), uniformly coating a diffusion layer solution on an outer side of the anode support tube to form the anode diffusion layer, attaching a concave surface A2 of a nanoimprint mold A on the anode diffusion layer, heat-drying, and separating the nanoimprint mold A to obtain the anode diffusion layer of a convex and ordered design;

a step 2), coating a catalyst layer slurry on a surface of the anode diffusion layer to form the anode catalyst layer with a smooth outer surface, and heat-drying, wherein an inner surface of the anode catalyst layer is in contact with the surface of the anode diffusion layer of the convex and ordered design, and is concave;

a step 3), hot-pressing an activated proton-exchange membrane tightly on the outer surface of the anode catalyst layer;

a step 4), coating the catalyst layer slurry on a surface of the proton-exchange membrane to form the cathode catalyst layer, attaching a concave surface B2 of a nanoimprint mold B to the cathode catalyst layer, heat-drying, and separating the nanoimprint mold B to obtain the cathode catalyst layer of the convex and ordered design; and a step 5), coating the diffusion layer solution on an outer surface of the cathode catalyst layer to form the cathode diffusion layer with a smooth outer surface, and heat-drying, wherein an inner surface of the cathode diffusion layer is in contact with the cathode catalyst layer of the convex and ordered design, and is concave.

7. The method according to claim 6, wherein the anode obtained after the step 2) is dried at a constant temperature.

8. The method according to claim 6, wherein a weight gain for forming the anode catalyst layer in the step 2) reaches 8 mg/cm$^2$; and a weight gain for forming the cathode catalyst layer in the step 4) reaches 8 mg/cm$^2$.

9. The method according to claim 6, wherein a weight gain for forming the anode diffusion layer in the step 1) reaches 4 mg/cm$^2$; and a weight gain for forming the cathode diffusion layer in the step 5) reaches 4 mg/cm$^2$.

10. The method according to claim 6, wherein a preparation method of the diffusion layer solution comprises: dissolving 20 g of an XR-72 carbon powder in a solution with a polytetrafluoroethylene content of 15 wt. %, adding 5 mL of an analytically-pure solution, and ultrasonic dispersing and stirring; and a preparation method of the catalyst layer slurry comprises: mixing 30 mg of a metal catalyst Pt/C with 0.5 mL of pure water, and adding 0.5 mL of a polymer electrolyte emulsion, 10 mL of a Nafion emulsion with a mass fraction of 5%, 0.5 mL of a binder, and 5 mL of an analytically-pure solution to obtain the catalyst layer slurry.

11. The method according to claim 4, wherein a preparation method of the diffusion layer solution comprises: dissolving 20 g of an XR-72 carbon powder in a solution with a polytetrafluoroethylene content of 15 wt. %, adding 5 mL of an analytically-pure solution, and ultrasonic dispersing and stirring; and a preparation method of the catalyst layer slurry comprises: mixing 30 mg of a metal catalyst Pt/C with 0.5 mL of pure water, and adding 0.5 mL of a polymer electrolyte emulsion, 10 mL of a Nafion emulsion with a mass fraction of 5%, 0.5 mL of a binder, and 5 mL of an analytically-pure solution to obtain the catalyst layer slurry.

* * * * *